United States Patent
Cohen et al.

(10) Patent No.: US 12,001,553 B2
(45) Date of Patent: Jun. 4, 2024

(54) DETECTING VEHICLE MALFUNCTIONS AND CYBER ATTACKS USING MACHINE LEARNING

(71) Applicant: Red Bend Ltd., Hod Ha'Sharon (IL)

(72) Inventors: Dror Cohen, Bet Hanan (IL); Alexander Kreines, Jerusalem (IL); Shachar Mendelowitz, Tel Aviv (IL)

(73) Assignee: Red Bend Ltd., Hod Ha'Sharon (IL)

( * ) Notice: Subject to any disclaimer, the term of this patent is extended or adjusted under 35 U.S.C. 154(b) by 248 days.

(21) Appl. No.: 17/404,759

(22) Filed: Aug. 17, 2021

(65) Prior Publication Data

US 2023/0054575 A1 Feb. 23, 2023

Related U.S. Application Data

(60) Provisional application No. 63/068,250, filed on Aug. 20, 2020.

(51) Int. Cl.
*G06F 21/56* (2013.01)
*G07C 5/08* (2006.01)

(52) U.S. Cl.
CPC ......... *G06F 21/566* (2013.01); *G07C 5/0808* (2013.01); *G06F 2221/034* (2013.01)

(58) Field of Classification Search
CPC .............................. G06F 21/566; G07C 5/0808
See application file for complete search history.

(56) References Cited

U.S. PATENT DOCUMENTS

| | | | | |
|---|---|---|---|---|
| 10,861,320 | B2 * | 12/2020 | Martin | H04W 4/029 |
| 11,010,472 | B1 * | 5/2021 | Powers | G06N 5/01 |
| 2014/0107993 | A1 * | 4/2014 | Cheng | G05B 17/02 |
| | | | | 700/32 |
| 2017/0043786 | A1 | 2/2017 | Mangette et al. | |
| 2019/0138423 | A1 * | 5/2019 | Agerstam | G06F 18/21 |
| 2019/0303567 | A1 * | 10/2019 | Batmaz | G06F 21/85 |
| 2020/0027105 | A1 * | 1/2020 | Ling | G06N 3/044 |
| 2020/0259851 | A1 * | 8/2020 | Manoselvam | H04L 63/1441 |
| 2021/0089941 | A1 * | 3/2021 | Chen | G06N 20/00 |

(Continued)

FOREIGN PATENT DOCUMENTS

| | | | | |
|---|---|---|---|---|
| EP | 3916667 A1 * | 12/2021 | | G06F 16/2379 |
| WO | 2019/191506 A1 | 10/2019 | | |
| WO | WO-2019191506 A1 * | 10/2019 | | G06F 11/3027 |

*Primary Examiner* — Matthew Smithers
*Assistant Examiner* — Shu Chun Gao
(74) *Attorney, Agent, or Firm* — Artegis Law Group, LLP

(57) ABSTRACT

Techniques for detecting anomalies or cyber attacks on a vehicle. A computer-implemented method for anomaly or attack detection includes determining, using a first model, a first predicted value of a first variable message associated with a vehicle, determining, using a second model, a second predicted value of the first variable message associated with the vehicle, determining, based on a difference between an actual value of the first variable message and the first predicted value of the first variable message and on a difference between the actual value of the first variable message and the second predicted value of the first variable message, a vector, and determining, using a third model, an output value based on the vector, the output value corresponding to at least one of a likelihood that an anomaly or an attack is occurring or a type of the anomaly or the attack.

20 Claims, 7 Drawing Sheets

(56) References Cited

U.S. PATENT DOCUMENTS

| | | | |
|---|---|---|---|
| 2021/0197848 A1* | 7/2021 | Kilaru | G06N 20/00 |
| 2021/0288984 A1* | 9/2021 | Jones | H04L 63/145 |
| 2021/0342847 A1* | 11/2021 | Shachar | G06N 20/00 |
| 2021/0406796 A1* | 12/2021 | Liu | G06Q 10/06315 |

* cited by examiner

DETECTING VEHICLE MALFUNCTIONS AND CYBER ATTACKS USING MACHINE LEARNING

CROSS-REFERENCE TO RELATED APPLICATION(S)

This application claims the benefit of U.S. Provisional Application No. 63/068,250, titled "DETECTING VEHICLE MALFUNCTIONS AND CYBER ATTACKS USING UNSUPERVISED MACHINE LEARNING," filed on Aug. 20, 2020. The subject matter of this application is incorporated by reference herein in its entirety.

BACKGROUND

Field of the Various Embodiments

The contemplated embodiments relate generally to computer science and, more specifically, to detecting vehicle malfunctions and cyber attacks using machine learning.

Description of the Related Art

Detection of cybersecurity attacks is critically important for modern vehicles. High complexity of the on-board software, the wide use of ADAS (advanced driver-assistance system) features, and the presence of wireless communication lines drastically increase the risk of remote cybersecurity attacks. Hackers can track vehicle location, steal vehicle data, and even wirelessly carjack vehicles by taking control of various vehicle features, such as entertainment system, brakes, windshield wipers, steering, climate control system, locks, transmission, and/or the like.

Hackers may rely on a wide variety of attack vectors to gain access to the vehicle. In some cases, vehicle functions can be accessed directly using the on-board diagnostic (OBD-II) port, USB port, and/or the like. A hacker can, for instance, execute arbitrary code on a device connected to the controller area network (CAN) bus via the OBD-II port. In other cases, vehicle functions can be accessed remotely via Bluetooth, cellular network, a wireless (WiFi) network, infotainment system, and/or the like. A hacker can, for example, gain access to the infotainment console in the vehicle and then exploit the rest of the vehicle, including accessing critical vehicle functions. While vehicle diagnostic codes and other information are typically accessible via the OBD-II ports, some vehicle manufacturers allow bidirectional diagnostic data exchange via the communication data link of the vehicle, such as the CAN bus. Such data can be maliciously manipulated or intercepted via remote or physical access.

Hackers may also use points of integration between the vehicle and other systems as attack vectors. For instance, a potential attack vector includes on board equipment (OBE) connected to a CAN bus, which broadcasts messages to other vehicles, roadside units, and/or the like related to various parameters such as vehicle size, vehicle weight, transmission state, acceleration set, speed, latitude, longitude, stability control status, brake system status, anti-lock brake status, auxiliary brake status, GPS position, longitudinal acceleration, latitude, steering wheel angle, positional accuracy, and/or the like. A hacker who gains unauthorized access to the OBE can feed false data to the compromised OBE, tamper with the messages, broadcast incorrect information, monitor vehicle location, and/or the like. Another potential attack vector includes mobile applications that provide cloud connectivity and allow vehicles to act as Internet of Things (IoT) endpoints. Such applications can provide access to vehicle functions (e.g., door lock/unlock, air conditioning system, lights, infotainment system, horns, and/or the like) or access to external services (e.g., parking, navigation, and/or the like). A hacker can hijack control of a vehicle's functions by exploiting a vulnerability in a mobile application (e.g., an unauthenticated API, weak cryptographic features, and/or the like).

Some systems implement machine learning based intrusion detection systems (IDS) that enable the detection of potential cybersecurity attacks. These systems often use various anomaly detection models aiming to directly identify abnormal metadata or values of the operational parameters of a vehicle. A drawback of such approaches is that they may detect and mitigate cyber-attacks in some scenarios, while turning out to be less resilient in other scenarios. Another approach relies on the domain knowledge of security experts to define system parameters, used as feature space inputs for machine learning models. A drawback of this approach is that the performance of these types of IDSs depends on the relevance of the predefined feature set to the nature of the anomaly that needs to be discovered, and, therefore, is unreliable when encountering new types of threats.

Accordingly, there is need for improved techniques of detecting and mitigating vehicle anomalies and cybersecurity attacks.

SUMMARY

One embodiment sets forth a computer-implemented method comprises determining, using a first model, a first predicted value of a first variable message associated with a vehicle, determining, using a second model, a second predicted value of the first variable message associated with the vehicle, determining, based on a difference between an actual value of the first variable message and the first predicted value of the first variable message and on a difference between the actual value of the first variable message and the second predicted value of the first variable message, a vector, and determining, using a third model, an output value based on the vector, the output value corresponding to at least one of a likelihood that an anomaly or an attack is occurring or a type of the anomaly or the attack.

Further embodiments provide, among other things, one or more non-transitory computer-readable media and system configured to implement the method set forth above.

At least one technical advantage of the disclosed techniques relative to the prior art is that the disclosed techniques provide an approach for detecting anomalies in and/or cyber attacks against a vehicle that does not rely on specific timing of events happening in the vehicle. Accordingly, the approach can be deployed in the vehicle or at a remote system without concern regarding corruption of the timings caused by transmission of data from the vehicle. Another technical advantage is that, by using an ensemble approach, the disclosed techniques can better handle different types of operational parameters and adapt to detecting anomalies and/or cyber attacks as they evolve with time without requiring additional training processes. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
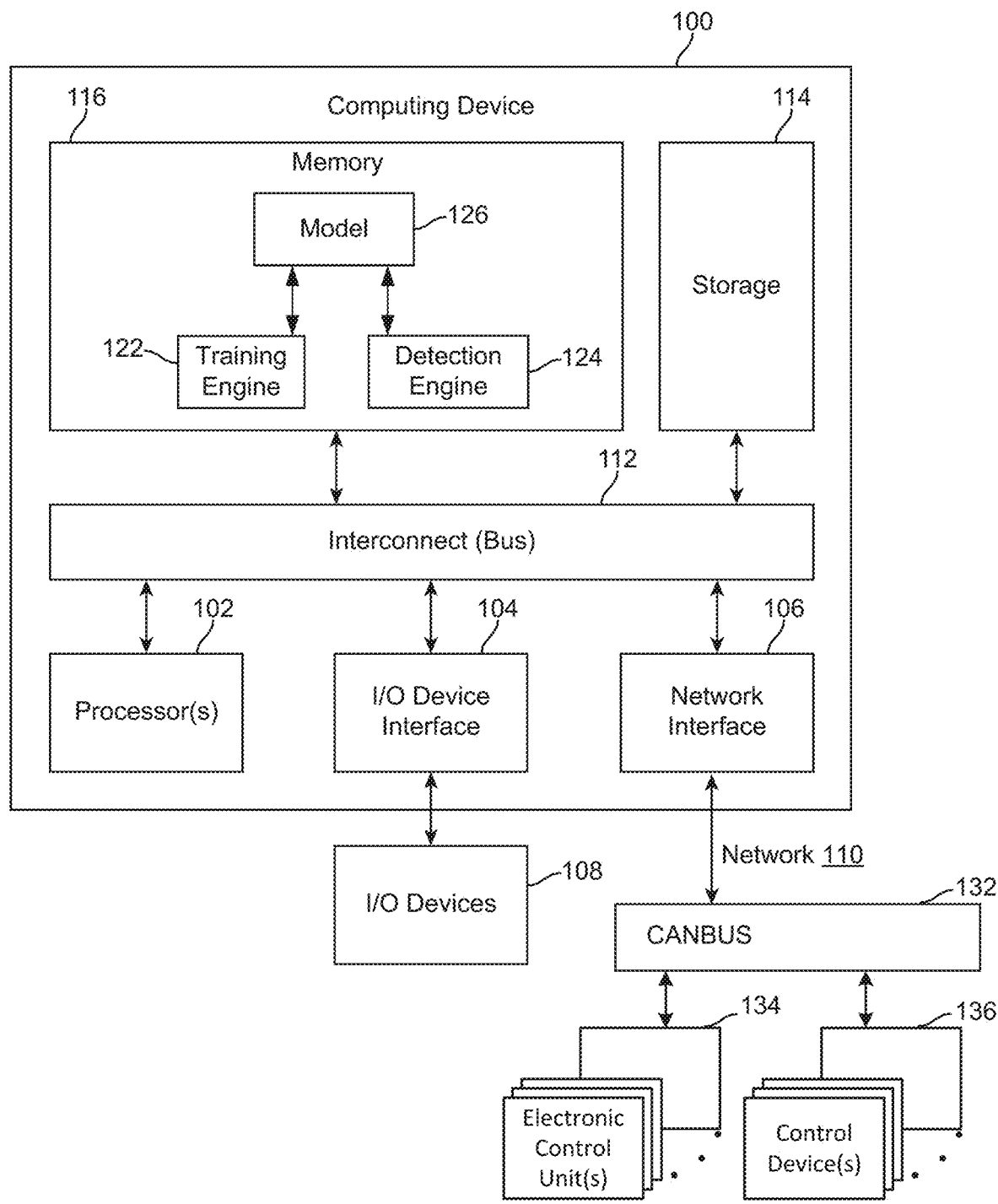
FIG. 1 is a schematic diagram illustrating a computing system configured to implement one or more aspects of the present disclosure.

FIG. 1 illustrates a computing device 100 configured to implement one or more aspects of the present disclosure. As shown, computing device 100 includes an interconnect (bus) 112 that connects one or more processor(s) 102, an input/output (I/O) device interface 104 coupled to one or more input/output (I/O) devices 108, memory 116, a storage 114, and a network interface 106.

Computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 described herein is illustrative and that any other technically feasible configurations fall within the scope of the present disclosure. In some embodiments, computing device 100 is implemented within a vehicle. For example, computing device 100 could be a computing device implemented in a head unit of the vehicle. In some other embodiments, computing device 100 is a computing device separate and/or remote from a vehicle. For example, computing device 100 could be a portable device (e.g., a smartphone) carried by a driver or passenger of the vehicle. As another example, computing device 100 could be a remote system (e.g., remote server system in a data center, a cloud computing system) that is communicatively coupled to the vehicle via one or more networks.

Processor(s) 102 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O device interface 104 enables communication of I/O devices 108 with processor(s) 102. I/O device interface 104 generally includes the requisite logic for interpreting addresses corresponding to I/O devices 108 that are generated by processor(s) 102. I/O device interface 104 may also be configured to implement handshaking between processor(s) 102 and I/O devices 108, and/or generate interrupts associated with I/O devices 108. I/O device interface 104 may be implemented as any technically feasible CPU, ASIC, FPGA, any other type of processing unit or device.

In one embodiment, I/O devices 108 include devices capable of providing input, such as a keyboard, a mouse, a touch-sensitive screen, smart device, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110. In some embodiments, I/O devices 108 include one or more sensors configured to acquire data and transmit signals associated with the data to computing device 100.

Memory 116 includes a random access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122, detection engine 124, and model 126. Training engine 122, detection engine 124, and model 126 are described in further detail below with respect to FIG. 2.

Storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122, detection engine 124, and model 126 may be stored in storage 114 and loaded into memory 116 when executed.

Network 110 includes any technically feasible type of communications network or networks that allows data to be exchanged between computing device 100 and external entities or devices, such as a web server or another networked computing device. For example, network 110 may include a CAN (controller-area network), wide area network (WAN), a local area network (LAN), a wireless (WiFi) network, and/or the Internet, among others.

CANBUS 132 (controller-area network bus) can be any technically feasible industry vehicle bus standard, message-based protocol, and/or the like that allows applications associated with devices and microcontrollers in a vehicle to communicate with each other without a host computer. In some embodiments, CANBUS 132 includes any technically feasible internal communication mechanism in a vehicle that supports communication between electronic control unit(s) 134 in the vehicle. In some embodiments, CANBUS 132 includes multiple CAN buses using one or more gateways to segment transmission of messages based on classification such as safety-critical functions (e.g., brakes), non-critical functions (e.g., lights), and/or the like. In some embodiments, CANBUS 132 can communicate with computing device 100 via one or more networks 110 (e.g., wireless networks, the Internet). For example, a CANBUS 132 implemented in a vehicle could communicate with a remote computing device 100. The vehicle could include its own computing device with a network interface. CANBUS 132 in the vehicle can communicate with (e.g., transmit data to and/or receive data from) the remote computing device 100 via the in-vehicle network interface interfacing with network 110.

Electronic control unit(s) 134 send and receive messages via CANBUS 132. In some embodiments, electronic control unit(s) 134 include units associated with one or more vehicle subsystems such as engine control, mirror adjustment, electric power steering, doors, transmission, battery system, antilock braking, audio systems, power windows, recharging system, airbags, cruise control, and/or the like. In some embodiments, a given electronic control unit 134 includes one or more central processing units, microprocessors, host processors and/or the like that receive and transmit messages. In some embodiments, a given electronic control unit 134 also include one or more CAN (controller-area network) controllers that store one or more serial bits received from CANBUS 132 until an entire message is available.

Control device(s) 136 include one or more devices connected to CANBUS 132 through one or more electronic control unit(s) 134. Control device(s) 136 include actuators, sensors, and/or the like. Sensors include vehicle tilt sensors, crankshaft sensors, rain sensors, engine temperature sensors, intake-air temperature sensors, coolant temperature sensors, outdoor temperature sensors, accelerator pedal sensors, wheel speed sensors, air conditioning on/off sensors, air-mass sensors, steering angle sensors, road speed sensors, parking sensors, lambda sensors, seat belt sensors, transmission range sensors, knock sensors, and/or the like. Actuators include different types of actuators such as pneumatic, hydraulic, electromagnetic, and/or the like used for applications such as engine actuators, idle speed actuators, steering wheel actuators, seat actuators, rear view mirror actuators, sunroof actuators, headlight actuators, and/or the like.

Figure 2:
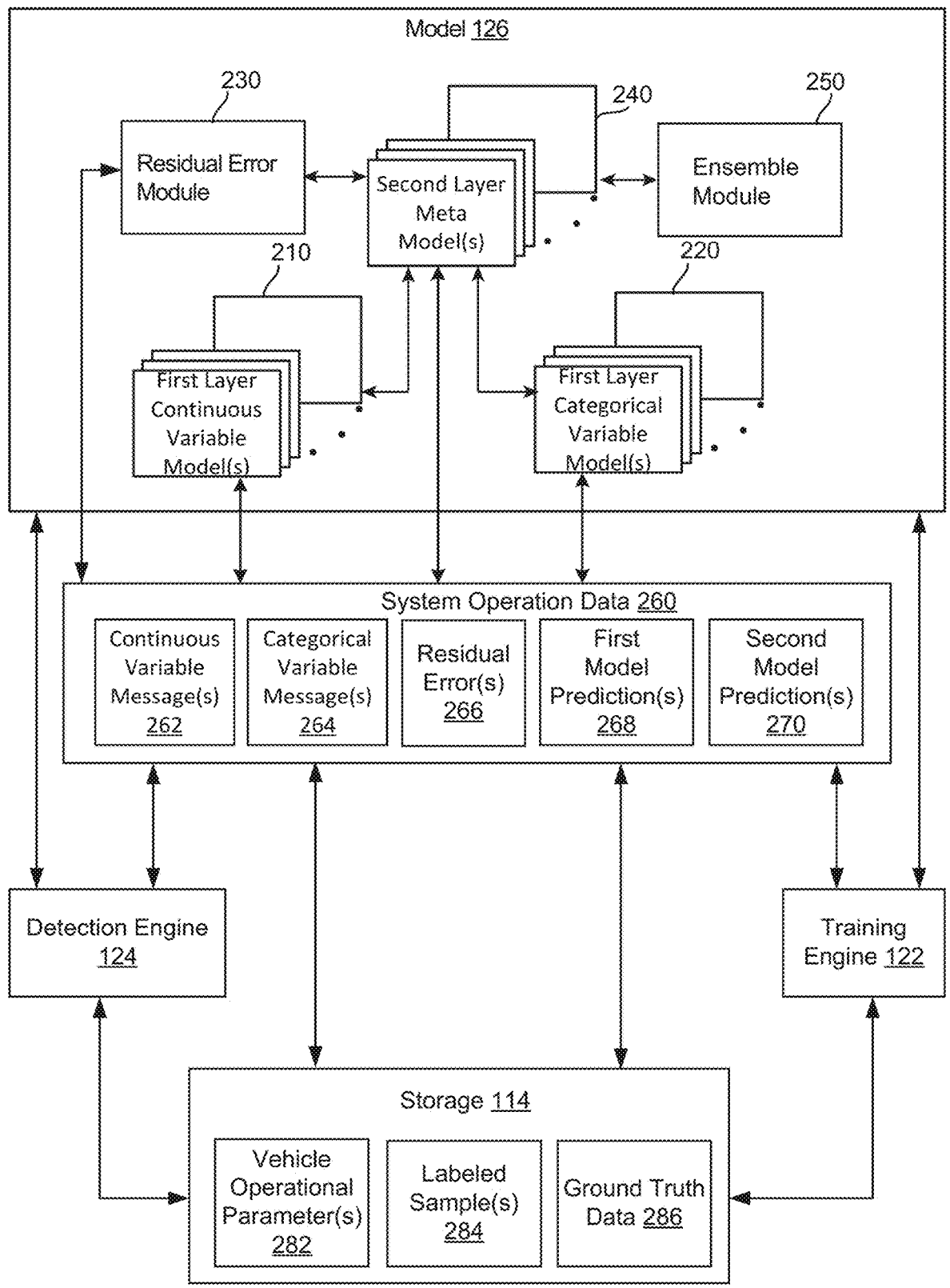
FIG. 2 is a more detailed illustration of the model of FIG. 1, according to various embodiments of the present disclosure.

FIG. 2 is a more detailed illustration of model 126 of FIG. 1, according to various embodiments of the present disclosure. As shown, model 126 includes, without limitation, first layer continuous variable model(s) 210, first layer categorical variable model(s) 220, residual error module 230, second layer meta model(s) 240, and/or ensemble module 250.

First layer continuous variable model(s) 210 includes any technically feasible machine learning model. In some embodiments, first layer continuous variable model(s) 210 includes regression models, time series models, support vector machines, decision trees, random forests, XGBoost, AdaBoost, CatBoost, gradient boosted trees, naïve Bayes classifiers, Bayesian networks, hierarchical models, ensemble models, autoregressive moving average (ARMA) models, autoregressive integrated moving average (ARIMA) models, and/or the like. In some embodiments, first layer continuous variable model(s) 210 includes recurrent neural networks (RNNs), convolutional neural networks (CNNs), deep neural networks (DNNs), deep convolutional networks (DCNs), deep belief networks (DBNs), restricted Boltzmann machines (RBMs), long-short-term memory (LSTM) units, gated recurrent units (GRUs), generative adversarial networks (GANs), self-organizing maps (SOMs), and/or other types of artificial neural networks or components of artificial neural networks. In other embodiments, first layer continuous variable model(s) 210 includes functionality to perform clustering, principal component analysis (PCA), latent semantic analysis (LSA), Word2vec, and/or the like. In some embodiments, first layer continuous variable model(s) 210 includes functionality to perform supervised learning, unsupervised learning, semi-supervised learning (e.g., supervised pre-training followed by unsupervised fine-tuning, unsupervised pre-training followed by supervised fine-tuning, and/or the like), self-supervised learning, and/or the like.

First layer continuous variable model(s) 210 predict the value of one or more continuous variable messages 262. In some embodiments, each continuous variable message 262 is predicted by a plurality of different first layer continuous variable models 210 (e.g., regression models, time series models, hierarchical models, and/or the like) that predict the current value of the continuous variable message 262. In some embodiments, each continuous variable message 262 is predicted by a combination of different first layer continuous variable models 210 selected based on resilience to one or more types of cyber attacks, as measured by low baseline errors, post attack amplification, and/or the like. For instance, a given continuous variable message 262 can be predicted by a combination of a time series model resilient against single point attack such as a single point in time insertion of falsified values (e.g., changing the revolutions per minute (RPM) value in a single timestamp to a randomly chosen value between recorded minimum and maximum RPM values), and a regression model resilient against replay of a recorded information from previous messages, a divergence attack (e.g., a gradual shift from the true value over multiple timestamps, which could be created by injecting data from a different record), and/or the like. Examples of types of cyber attacks are further described below with reference to FIGS. 5A-5C.

Figure 5A:
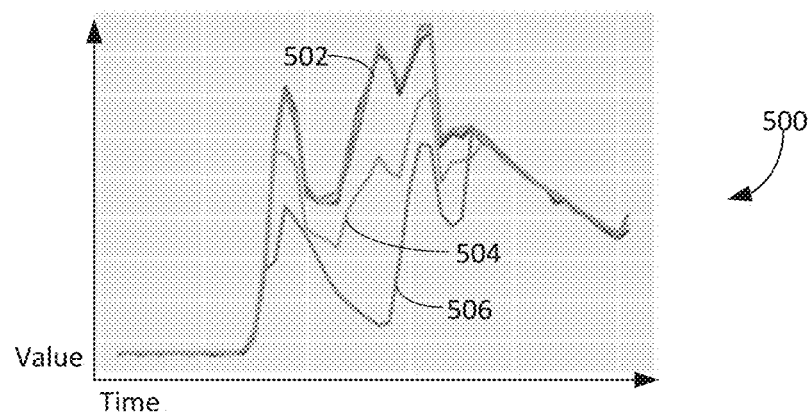
FIGS. 5A-5C are graphs illustrating examples of different types of attacks, according to various embodiments of the present disclosure.
Figure 5B:
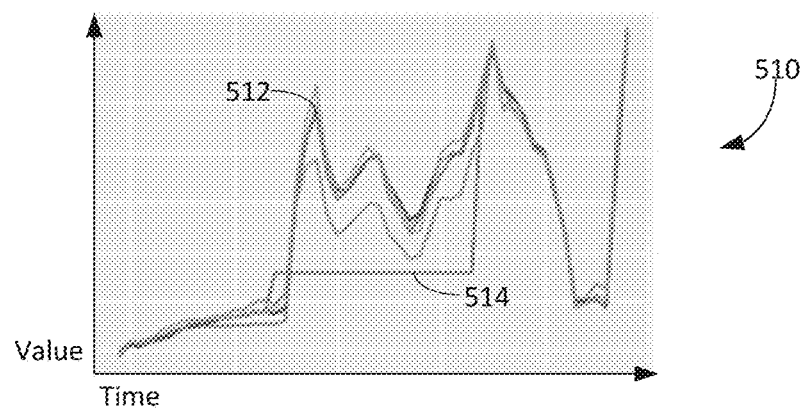
Figure 5C:
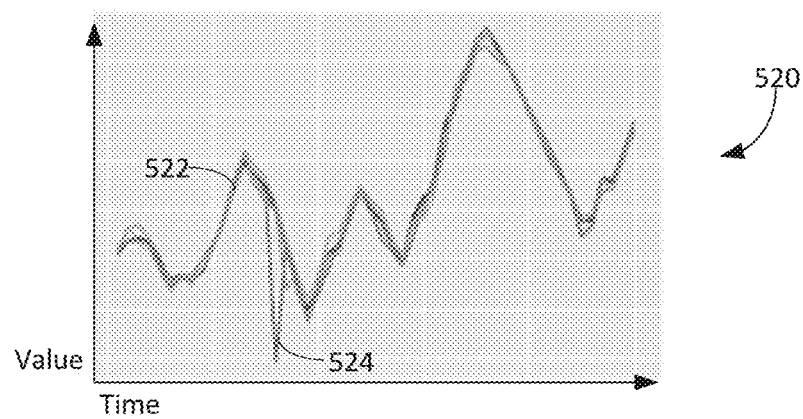

Referring to FIGS. 5A-5C, FIGS. 5A-5C are graphs illustrating examples of different types of attacks, according to various embodiments of the present disclosure. FIGS. 5A-5C include graphs that plot a value over time. In FIG. 5A, graph 500 illustrates a divergence attack. Lines 502 graph a sampling of true values. Line 504 graphs a first shift from the true values over a range of timestamps. Line 506 graphs a second, larger shift from the true values over a similar range of timestamps.

In FIG. 5B, graph 510 illustrates a static attack, in which a value is made constant over a period of time (e.g., changing the revolutions per minute (RPM) value to a constant value over a range of timestamps). Lines 512 graph a sampling of true values. Line 514 graphs a set of values that includes a constant value over a period of time, indicated by the horizontal portion of line 514.

In FIG. 5C, graph 520 illustrates a single point attack. Lines 522 graph a sampling of true values. Line 524 graphs a change of the value in a single timestamp, which is characteristic of a single point attack.

Returning to FIG. 2, in some embodiments, first layer continuous variable model(s) 210 predict the value of a given continuous variable message 262 (e.g., revolutions per minute/RPM) based on recent historical values of the continuous variable message (e.g., 10-20 different data points prior to the current value, a predetermined range of historical values, and/or the like). In some embodiments, first layer continuous variable model(s) 210 predicts a current value for a given continuous variable message 262 (e.g., RPM) based on current values of one or more correlated messages (e.g., acceleration pedal position, vehicle speed, torque of engine, gear, brakes, and/or the like), previously observed data points for the correlated messages (e.g., 10-20 different data points prior to the current value of the correlated messages, a predetermined range of historical values, and/or the like), and/or the like. In some embodiments, first layer continuous variable model(s) 210 predict the value of a given continuous variable message 262 (e.g., RPM) based on any combination of recent data points on historical values as well as additional correlated messages. In various embodiments, a current or historical value of a continuous variable message 262 corresponds to a vehicle operational parameter 282, where the value is a current or historical value of the vehicle operational parameter.

First layer categorical variable model(s) 220 includes any technically feasible machine learning model. In some embodiments, first layer categorical variable model(s) 220 includes classification models, multi-class classification models, and/or the like. In some embodiments, first layer categorical variable model(s) 220 includes decision trees, random forests, XGBoost, AdaBoost, CatBoost, gradient boosted trees, naïve Bayes classifiers, k-nearest neighbors, and/or the like. In some embodiments, first layer categorical variable model(s) 220 includes recurrent neural networks (RNNs), convolutional neural networks (CNNs), deep neural networks (DNNs), deep convolutional networks (DCNs), deep belief networks (DBNs), restricted Boltzmann machines (RBMs), long-short-term memory (LSTM) units, gated recurrent units (GRUs), generative adversarial networks (GANs), self-organizing maps (SOMs), and/or other types of artificial neural networks or components of artificial neural networks. In other embodiments, first layer categorical variable model(s) 220 includes functionality to perform clustering, principal component analysis (PCA), latent semantic analysis (LSA), Word2vec, and/or the like. In some embodiments, first layer categorical variable model(s) 220 includes functionality to perform supervised learning, unsupervised learning, semi-supervised learning (e.g., supervised pre-training followed by unsupervised fine-tuning, unsupervised pre-training followed by supervised fine-tuning, and/or the like), self-supervised learning, and/or the like.

First layer categorical variable model(s) 220 predict one or more classes associated with a given categorical variable message 264 at a given point in time. In some embodiments, first layer categorical variable model(s) 220 calculates the probability of a given categorical variable message 264 having a certain classification at a given time point (e.g., 30% probability of state of gear being $1^{st}$ gear). In some embodiments, each categorical variable message 264 is predicted by a plurality of different first layer categorical variable model(s) 220 (e.g., decision trees, random forests, XGBoost, AdaBoost, CatBoost, gradient boosted trees, and/or the like) to predict the current value of the categorical variable message 264. In some embodiments, each categorical variable message 264 is predicted by a combination of different first layer categorical variable models 220 selected based on resilience to one or more types of cyber attacks, as measured by low baseline errors, post attack amplification, and/or the like.

In some embodiments, first layer categorical variable model(s) 220 predict the classification of a given categorical variable message 264 (e.g., probability of state of gear being reverse, neutral, and/or the like) based on recent historical values of the message (e.g., 10-20 different data points prior to the current value, a predetermined range of historical values, and/or the like). In some embodiments, first layer categorical variable model(s) 220 predicts a probability associated with a classification for a given categorical variable message 264 (e.g., 80% probability of state of gear being $5^{th}$ gear) based on current values of one or more correlated messages (e.g., pedal position, vehicle speed, torque of engine, gear, brakes, and/or the like), previously observed data points for the correlated messages (e.g., 10-20 different data points prior to the current value of the correlated messages, a predetermined range of historical values), and/or the like. In some embodiments, first layer categorical variable model(s) 220 predict the classification of a given categorical variable message 264 (e.g., 0.1% probability of state of gear being reverse) based on any combination of recent data points on historical values as well as additional correlated messages. In various embodiments, a current or historical classification or value of a categorical variable message 264 corresponds to a vehicle operational parameter 282, where the classification or value is a current or historical classification or value of the vehicle operational parameter.

Residual error module 230 compares the predicted value of one or more continuous variable messages 262 generated by first layer continuous variable model(s) 210 with the actual value of the continuous variable messages 262. In some embodiments, where each continuous variable message 262 is predicted by a plurality of different first layer continuous variable models 210 (e.g., regression models, time series models, hierarchical models, and/or the like), residual error module 230 compares the predicted value generated by each first layer continuous variable model(s) 210 with the actual value of the continuous variable messages 262.

Residual error module 230 calculates, for each first layer continuous variable model(s) 210, an entry in a vector of errors or residuals at each time point between the actual value of the continuous variable messages 262 and the predicted value of the continuous variable messages 262.

Residual error module 230 also compares the predicted probability of a given categorical variable message 264 having a given classification generated by first layer categorical variable model(s) 220 (e.g., 80% probability of state of gear being $5^{th}$ gear) with the actual value of the categorical variable messages 264 (e.g., 100% value associated with observed state of gear being $5^{th}$ gear). In some embodiments, where each categorical variable message 264 is predicted by a plurality of different first layer categorical variable models 220 (e.g., decision trees, random forests, XGBoost, AdaBoost, CatBoost, gradient boosted trees, and/or the like), residual error module 230 compares the predicted value generated by each first layer categorical variable model(s) 220 (e.g., 80% probability of state of gear being $5^{th}$ gear; 30% probability of state of gear being $5^{th}$ gear) with the actual value of the categorical variable messages 264 (e.g., 100% value associated with observed state of gear being $5^{th}$ gear).

Residual error module 230 calculates, for each first layer categorical variable model(s) 220, an entry in a vector of calculated probabilities at each time point between the actual value of the categorical variable messages 264 and the predicted value of the categorical variable messages 264 (e.g., difference between 100% actual value and 80% prediction of 5th gear, difference between 100% actual value and 30% prediction of 5th gear, and/or the like).

Second layer meta model(s) 240 includes any technically feasible machine learning model. In some embodiments, second layer meta model(s) 240 includes one or more anomaly detection models such as neural network autoencoders, isolation forests, Local Outlier Factors (LOF), robust covariance, one class support vector machines (SVM), and/or the like. In some embodiments, second layer meta model(s) 240 uses one or more anomaly detection techniques such as k-nearest neighbor, correlation-based outline detection, tensor-based outlier detection, cluster analysis-based outlier detection, fuzzy logic-based outliner detection, ensemble techniques (e.g., feature bagging, score normalization, stacking, boosting) and/or the like. In some embodiments, second layer meta model(s) 240 includes an ensemble of different anomaly detection models. In some embodiments, second layer meta model(s) 240 includes recurrent neural networks (RNNs), convolutional neural networks (CNNs), deep neural networks (DNNs), deep convolutional networks (DCNs), deep belief networks (DBNs), restricted Boltzmann machines (RBMs), long-short-term memory (LSTM) units, gated recurrent units (GRUs), generative adversarial networks (GANs), self-organizing maps (SOMs), and/or other types of artificial neural networks or components of artificial neural networks. In other embodiments, second layer meta model(s) 240 includes functionality to perform clustering, principal component analysis (PCA), latent semantic analysis (LSA), Word2vec, and/or the like. In some embodiments, second layer meta model(s) 240 includes regression models, support vector machines, decision trees, random forests, XGBoost, AdaBoost, CatBoost, gradient boosted trees, naïve Bayes classifiers, Bayesian networks, hierarchical models, and/or ensemble models. In some embodiments, second layer meta model(s) 240 includes functionality to perform supervised learning, unsupervised learning, semi-supervised learning (e.g., supervised pre-training followed by unsupervised fine-tuning, unsupervised pre-training followed by supervised fine-tuning, and/or the like), self-supervised learning, and/or the like.

Second layer meta models 240 receives, as input, the vectors of errors or residuals or probabilities produced by residual error module 230. Second layer meta model(s) 240 can also receive, as input, the predictions produced by any combination of first layer continuous variable model(s) 210, first layer categorical variable model(s) 220, and/or the like. In some embodiments, second layer meta model(s) 240 receives, as additional input, labeled sample(s) 284 upon which it is trained to classify between a normal system operation and an attack. Second layer meta model(s) 240 captures the normal combined outcomes of first layer continuous variable model(s) 210, first layer categorical variable model(s) 220, and/or residual error module 230 under diverse operational states of the system, such as computing device 100, and identifies when the common relations between the predictions produced by first layer continuous variable model(s) 210, first layer categorical variable model(s) 220, residual error module 230, and/or the like are disrupted.

In some embodiments, second layer meta model(s) 240 is trained on any combination of the vector of errors or residuals, vector of calculated probabilities, and/or the like generated by residual error module 230 under normal system operation, the predicted values generated by any combination of models 210 and/or 220, the actual values of messages 262 and/or 264, and/or the like. In some instances, a set of predicted residuals or probabilities that stand out of the normal samples cluster, upon which second layer meta model(s) 240 was trained, will be identified as anomaly or attack. In some embodiments, second layer meta model(s) 240 identifies an anomaly or attack based on a comparison between the vector of errors or residuals, vector of calculated probabilities, predicted values, actual values, and/or the like and a predefined threshold criteria.

In some embodiments, second layer meta model(s) 240 calculates a score (e.g., a risk score) reflecting the probability of an anomaly or attack based on the vector of errors or residuals, vector of calculated probabilities, and/or the like generated by residual error module 230, the predicted values generated by any combination of models 210 and/or 220, the actual values of messages 262 and/or 264, and/or the like. In some embodiments, second layer meta model(s) 240 calculates a score (e.g., a risk score, a probability score) reflecting the probability of an anomaly or attack based on combination of predictions generated by any combination of first layer continuous variable model(s) 210 and/or first layer categorical variable model(s) 220, actual values of messages 262 and/or 264, vectors generated by residual error module 230, and/or the like in multiple attack scenarios, diverse operational system states, and/or the like. In some embodiments, second layer meta model(s) 240 can output a binary output (e.g., 0 or 1, no or yes) indicating whether an anomaly/attack is present or not. In some embodiments, second layer meta model(s) 240 can output information indicating a type of anomaly or attack and/or probabilities of different types of anomaly or attack. For example, second layer meta models(s) 240 could output a vector of probabilities, where each probability in the vector indicates the probability of a different type of anomaly or attack.

Ensemble module 250 improves the performance of second layer meta model(s) 240 by using one or more ensemble learning techniques. In some embodiments, ensemble module 250 uses majority votes, averaging, individual thresholding and/or the like as means for combining the models' predictions, thus disregarding the possible complexity in a combination of different models' predictions in multiple attack scenarios and diverse operational system states. In some embodiments, ensemble module 250 can combine one or more outputs from second layer meta model(s) 240. For example, ensemble module 250 could combine vectors of probabilities of types of attack over a range of time to determine whether an anomaly or attack is present. As another example, ensemble module 250 could combine or aggregate outputs from multiple second layer meta models 240.

System operation data 260 includes, without limitation, continuous variable message(s) 262, categorical variable message(s) 264, first model prediction(s) 268, residual error(s) 266, and/or second model prediction(s) 270. Continuous variable message(s) 262 include one or more CANBUS messages associated with one or more continuous variables derived from vehicle operational parameter(s) 282 (e.g., RPM). In some embodiments, continuous variable message(s) 262 are relayed to an offboard server. Categorical variable message(s) 264 include one or more CANBUS messages associated with one or more categorical variables derived from vehicle operational parameter(s) 282 (e.g., state of gear being reverse, neutral, and/or the like). In some embodiments, categorical variable message(s) 264 are relayed to an offboard server.

First model prediction(s) 268 include one or more predicted values of one or more continuous variable messages 262 generated by first layer continuous variable model(s) 210. Second model prediction(s) 270 include one or more predicted probabilities of one or more categorical variable message(s) 264 having one or more classifications generated by first layer categorical variable model(s) 220. Residual error(s) 266 include vector of errors or residuals, vector of calculated probabilities, and/or the like generated by residual error module 230.

Storage 114 includes, without limitation, vehicle operational parameter(s) 282, labeled sample(s) 284, and/or ground truth data 286. Vehicle operational parameter(s) 282 includes any data associated with the operation of a vehicle, including data associated with one or more vehicle subsystems (e.g., engine control, mirror adjustment, electric power steering, doors, transmission, battery system, antilock braking, audio systems, power windows, recharging system, airbags, cruise control), one or more sensors (e.g., vehicle tilt sensors, crankshaft sensors, rain sensors, engine temperature sensors, intake-air temperature sensors, coolant temperature sensors, outdoor temperature sensors, accelerator pedal sensors, wheel speed sensors, air conditioning on/off sensors, air-mass sensors, steering angle sensors, road speed sensors, parking sensors, lambda sensors, seat belt sensors, transmission range sensors, knock sensors), one or more actuators (e.g., engine actuators, idle speed actuators, steering wheel actuators, seat actuators, rear view mirror actuators, sunroof actuators, headlight actuators) and/or the like. In some embodiments, vehicle operational parameter(s) 282 includes data collected during one or more driving sessions by one or more event data recorders (EDRs), one or more openXC hardware (e.g., OpenXC dongle), one or more data recording apps, and/or the like.

Labeled sample(s) 284 include one or more data sets that have been tagged with one or more labels. In some embodiments, labeled sample(s) 284 includes one or more data sets indicating the range of values of one or more vehicle operational parameter(s) 282 under normal system operation or during an anomaly or attack. Ground truth data 286 includes one or more data sets associated with ideal or expected vehicle operational parameter(s) during normal system operation. In some embodiments, ground truth data 286 includes vehicle operational parameter(s) 282 includes data collected during one or more driving sessions.

During training of model 126, training engine 122 trains a given neural network comprising any of first layer continuous variable model(s) 210, first layer categorical variable model(s) 220, or second layer meta model(s) 240 using any technically feasible technique for supervised learning, unsupervised learning, semi-supervised learning (e.g., supervised pre-training followed by unsupervised fine-tuning, unsupervised pre-training followed by supervised fine-tuning, and/or the like), self-supervised learning, and/or the like. Training engine 122 uses vehicle operational parameters 282, labeled samples 284, and/or ground truth data 286 as training data inputs during the training of model 126. In some embodiments, training engine 122 trains a given neural network comprising any of first layer continuous variable model(s) 210, first layer categorical variable model(s) 220, and/or second layer meta model(s) 240 using stochastic gradient descent, stochastic optimization method, and/or the like. In some embodiments, training engine 122 computes the gradient of a given loss function with respect to the weights of a given neural network comprising any of first layer continuous variable model(s) 210, first layer categorical variable model(s) 220, and/or second layer meta model(s) 240 and updates the weights by taking a step in a direction opposite to the gradient. In one instance, the magnitude of the step is determined by a training rate, which can be a constant rate (e.g., a step size of 0.001, and/or the like).

In some embodiments, training engine 122 updates the model parameters of a given neural network comprising any of first layer continuous variable model(s) 210, first layer categorical variable model(s) 220, and/or second layer meta model(s) 240 at each training iteration to reduce the value of the mean squared error for the corresponding loss function. In some embodiments, the update is performed by propagating the loss backwards through the neural network to adjust parameters of the model or weights on connections between neurons of the neural network.

In some embodiments, training engine 122 repeats the training process for multiple iterations until a threshold condition is achieved. In some embodiments, the threshold condition is achieved when the training process reaches convergence. For instance, convergence is reached when the mean squared error for the loss function changes very little or not at all with each iteration of the training process. In another instance, convergence is reached when the mean squared error for the loss function stays constant after a certain number of iterations. In some embodiments, the threshold condition is a predetermined value or range for the mean squared error associated with the loss function. In some embodiments, the threshold condition is a certain number of iterations of the training process (e.g., 100 epochs, 600 epochs), a predetermined amount of time (e.g., 2 hours, 50 hours, 48 hours), and/or the like.

In some embodiments, training engine 122 trains a given neural network comprising any of first layer continuous variable model(s) 210, first layer categorical variable model(s) 220, and/or second layer meta model(s) 240 using one or more hyperparameters. Each hyperparameter defines "higher-level" properties of the neural network instead of internal parameters that are updated during training and subsequently used to generate predictions, inferences, scores, and/or other output. Hyperparameters include a learning rate (e.g., a step size in gradient descent), a convergence parameter that controls the rate of convergence in a machine learning model, a model topology (e.g., the number of layers in a neural network or deep learning model), a number of training samples in training data for a machine learning model, a parameter-optimization technique (e.g., a formula and/or gradient descent technique used to update parameters of a machine learning model), a data-augmentation parameter that applies transformations to inputs, a model type (e.g., neural network, clustering technique, regression model, support vector machine, tree-based model, ensemble model, etc.), and/or the like. In some embodiments, the training samples include vehicle operational parameters 282, labeled samples 284, and/or ground truth data 286.

In operation, first layer continuous variable model(s) 210 predict the value of one or more continuous variable messages 262. First layer categorical variable model(s) 220 predict one or more classes associated with a given categorical variable message 264 at a given point in time. Residual error module 230 compares the predicted value of one or more continuous variable messages 262 generated by first layer continuous variable model(s) 210 with the actual value of the continuous variable messages 262. Residual error module 230 calculates, for each first layer continuous variable model(s) 210, a vector of errors or residuals at each time point between the actual value of the continuous variable messages 262 and the predicted value of the continuous variable messages 262. Residual error module 230 also compares the predicted probability of a given categorical variable message 264 having a given classification generated by first layer categorical variable model(s) 220 with the actual value of the categorical variable messages 264. Residual error module 230 calculates, for each first layer categorical variable model(s) 220, a vector of calculated probabilities at each time point between the actual value of the categorical variable messages 264 and the predicted value of the categorical variable messages 264. Second layer meta model(s) 240 calculates a score (e.g., a risk score) reflecting the probability of an anomaly or attack based on the vector of errors or residuals, vector of calculated probabilities, and/or the like generated by residual error module 230. Ensemble module 250 improves the performance of second layer meta model(s) 240 by using one or more ensemble learning techniques to combine outputs of second layer meta model(s) 240 (e.g., outputs over a period of time, outputs from multiple second layer meta models 240). An example of operation of the first layer and second layer models is described below with reference to FIG. 3.

In some embodiments, training engine 122 can train model 126 using labeled samples 284 and/or ground truth data 286 collected from actual driving sessions with actual drivers. In an example, data could be collected from respective driving sessions by multiple drivers (e.g., 10 drivers, each driving a total of about 23 hours on a round-trip route of about 46 km). The multi-driver dataset would be divided into a training dataset (e.g., 70% of the overall dataset) and a validation dataset (e.g., 30% of the overall dataset). The training dataset can include data that does not include any anomalies/attacks and labeled as clean (no anomaly or attack) data, and data that are modified to include attacks and labeled as anomalous data. The validation dataset can also include clean data and anomalous data similar to the training dataset. Training engine 122 would use the training dataset to train model 126, and then use the validation dataset to verify the efficacy and accuracy of model 126.

Figure 6A:
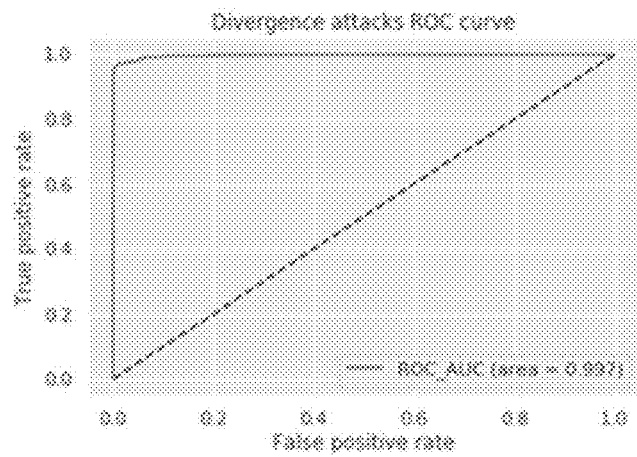
FIGS. 6A-6C illustrate receiver operating characteristic curves for a model trained using supervised learning, according to various embodiments of the present disclosure.
Figure 6B:
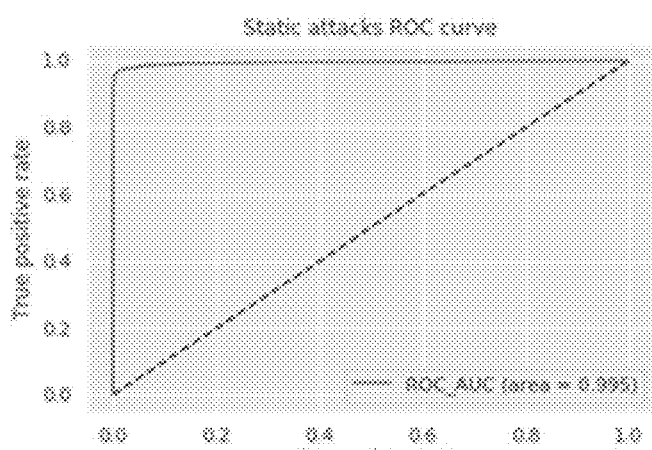
Figure 6C:
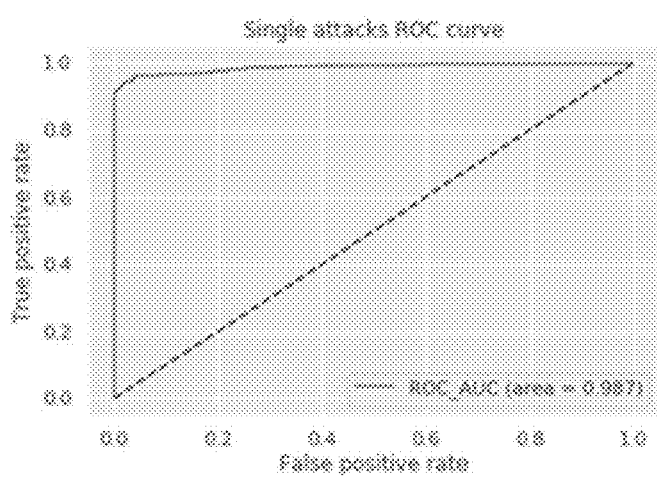

In some embodiments, model 126 can be trained using supervised learning or unsupervised learning. FIGS. 6A-6C illustrate receiver operating characteristic (ROC) curves for model 126 trained using supervised learning, according to various embodiments of the present disclosure. In particular, FIGS. 6A-6C illustrate example ROC curves of model 126 versus different types of attacks. FIG. 6A illustrate an ROC curve of model 126 against divergence attacks, FIG. 6B illustrate an ROC curve of model 126 against static attacks, and FIG. 6C illustrate an ROC curve of model 126 against single point attacks.

Figure 7A:
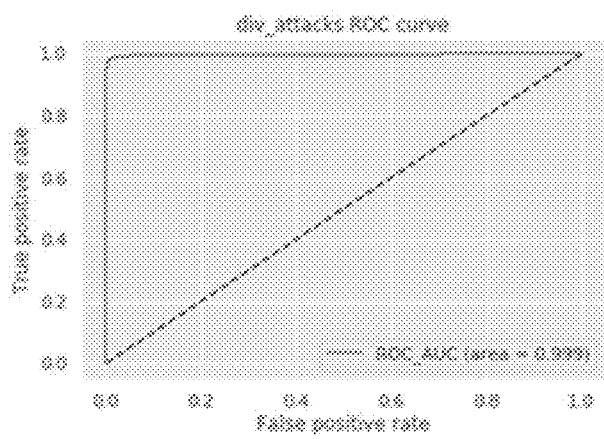
FIGS. 7A-7C illustrate receiver operating characteristic curves for a model trained using unsupervised learning, according to various embodiments of the present disclosure.
Figure 7B:
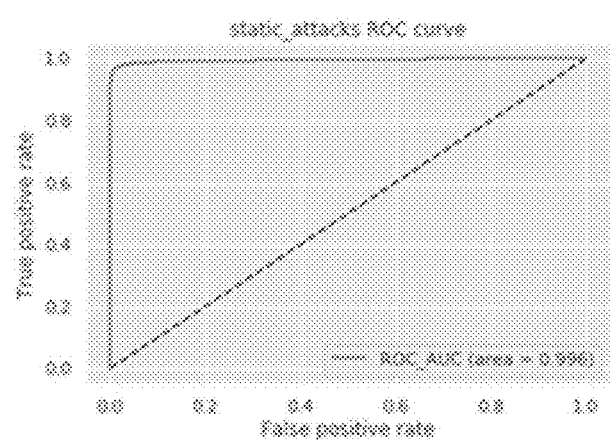
Figure 7C:
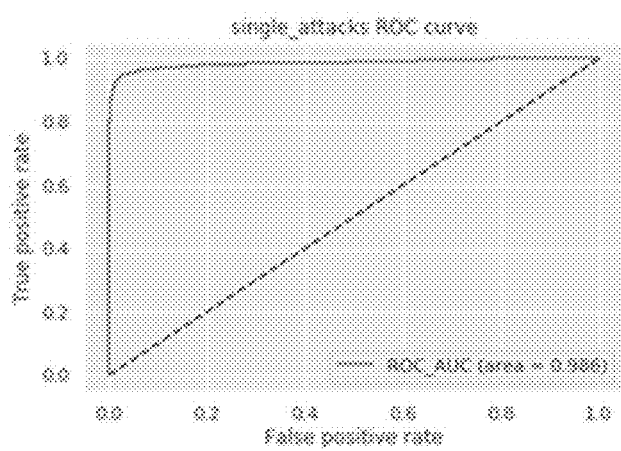

FIGS. 7A-7C illustrate receiver operating characteristic (ROC) curves for model 126 trained using unsupervised learning, according to various embodiments of the present disclosure. In particular, FIGS. 7A-7C illustrate example ROC curves of model 126 versus different types of attacks. FIG. 7A illustrate an ROC curve of model 126 against divergence attacks, FIG. 7B illustrate an ROC curve of model 126 against static attacks, and FIG. 7C illustrate an ROC curve of model 126 against single point attacks. As shown in the ROC curves in FIGS. 6A-7C, model 126 can achieve good diagnostic performance versus different types of attacks when trained using supervised learning or unsupervised learning.

Detection engine 124 includes functionality to apply the trained model 126 (e.g., the trained neural network) comprising any of first layer continuous variable model(s) 210, first layer categorical variable model(s) 220, and/or second layer meta model(s) 240 on data collected during a current driving session of a vehicle, in order to detect anomalies or attacks during operation of the vehicle. For example, detection engine 124 can apply model 126 to continuous variable messages 262, categorical variable messages 264, and/or vehicle operational parameters 282 during the current driving session to detect anomalies and attacks in real-time or near real-time. In some embodiments, detection engine 124 can apply the trained model 126 on data collected from multiple vehicles. For example, computing device 100 associated with a vehicle fleet management system can receive data from vehicles in a fleet. Detection engine 124 can process the data from the vehicles in the fleet to detect anomalies or attacks on any of the vehicles in the fleet.

While a double-layered method for detecting vehicle malfunctions and cyber attacks has been discloses, the method can involve multiple layers of models. In some embodiments, the first layer continuous variable model(s) 210, first layer categorical variable model(s) 220, and/or second layer meta model(s) 240 includes N layers of models. In some embodiments, the method involves a multilayer model comprised of a plurality of machine learning models composed in a hierarchical structure. In some embodiments, any additional layers of models are composed in a recursive manner. In some embodiments, the input to any of the models is composed of any amount of variable, simultaneously, each of which may be either continuous or categorical (e.g., 77 continuous variables, 1 categorical, 699 categorical and 1 continuous variable, and/or the like). In addition, while disclosed embodiments are discussed in relation to detecting anomalies or attacks in vehicles, the disclosed techniques can be used to detect any malfunctions in any type of networked setting.

Figure 3:
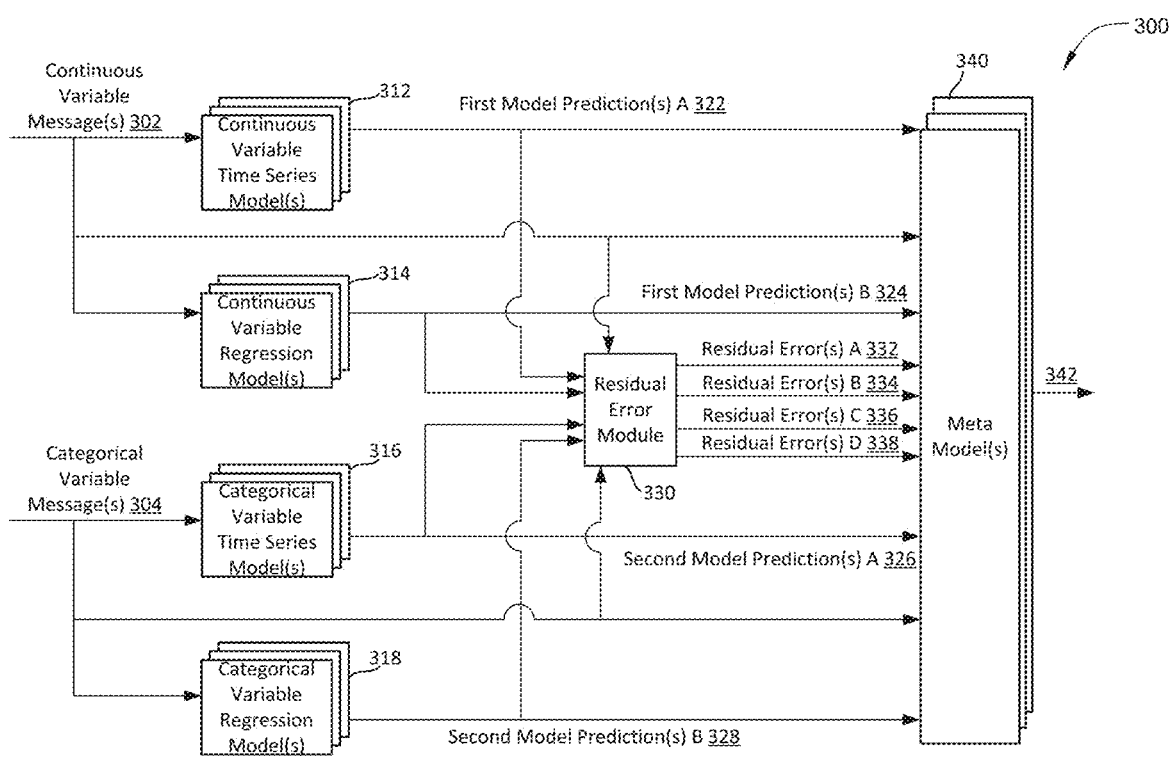
FIG. 3 is an illustration of a machine learning system having first layer and second layer models, according to various embodiments of the present disclosure.

FIG. 3 is an illustration of a machine learning system 300 having first layer and second layer models, according to various embodiments of the present disclosure. In various embodiments, machine learning system 300 implements model 126, and executes a training engine 122 or a detection engine 124 that uses model 126. Machine learning system 300 includes one or more first layer models 312, 314, 316, and/or 318, which correspond to first layer continuous variable models 210 and/or first layer categorical variable models 220. In particular, continuous variable time series model(s) 312 and continuous variable regression model(s) 314 correspond to first layer continuous variable model(s) 210, and categorical variable time series model(s) 316 and categorical variable regression model(s) 318 correspond to first layer categorical variable model(s) 220. Machine learning system 300 also includes one or more meta models 340, which correspond to second layer meta model(s) 240. Machine learning system 300 further includes a residual error module 330, which corresponds to residual error module 230.

Machine learning system 300 can receive one or more continuous variable messages 302 (e.g., continuous variable messages 262) and/or one or more categorical variable messages 304 (e.g., categorical variable messages 264). Models 312 and/or 314 receive and process continuous variable messages 302 to generate one or more predictions (e.g., predicted values of continuous variable messages associated with one or more vehicle operational parameters). In particular, continuous variable time series model(s) 312 generate first model prediction(s) A 322, and continuous variable regression model(s) 314 generate first model prediction(s) B 324. First model predictions A 322 and/or B 324 correspond to first model predictions 268. Models 316 and/or 318 receive and process categorical variable messages 304 to generate one or more predictions (e.g., predicted values of categorical variable messages associated with one or more vehicle operational parameters). In particular, categorical variable time series model(s) 316 generate second model prediction(s) A 326, and categorical variable regression model(s) 318 generate second model prediction(s) B 328. Second model predictions A 326 and/or B 328 correspond to second model predictions 270. In some embodiments, machine learning system 300 can include other continuous variable models in addition to and/or instead of time series models or regression models, and similarly other categorical variable models in addition to and/or instead of time series models or regression models.

In some embodiments, continuous variable time series model(s) 312 include at least one time series model for each vehicle operational parameter included in continuous variable messages 302 (e.g., a time series model for RPM messages, a time series model for steering wheel angle messages, a time series model for transmission torque messages, and so on). In some embodiments, continuous variable time series model(s) 312 include at least one time series model that can process continuous variable messages 302 associated with multiple vehicle operational parameters, such as a parameter of interest and one or more additional correlated parameters. For example, a time series model could process RPM messages, steering wheel angle messages, and transmission torque messages together to generate predictions.

In some embodiments, continuous variable regression model(s) 314 include at least one regression model for each vehicle operational parameter included in continuous variable messages 302 (e.g., a regression model for RPM messages, a regression model for steering wheel angle messages, a regression model for transmission torque messages, and so on).

In some embodiments, categorical variable time series model(s) 316 include at least one time series model for each vehicle operational parameter included in categorical variable messages 304 (e.g., a time series model for gear state messages, a time series model for door status messages, a time series model for parking brake status messages, and so on). In some embodiments, categorical variable time series model(s) 316 include at least one time series model that can process categorical variable messages 304 associated with multiple vehicle operational parameters, such as a parameter of interest and one or more additional correlated parameters.

In some embodiments, categorical variable regression model(s) 318 include at least one regression model for each vehicle operational parameter included in categorical variable messages 304 (e.g., a regression model for gear state messages, a regression model for door status messages, a regression model for parking brake status messages, and so on).

First model predictions A 322 include one or more predicted values of one or more continuous variable messages 302 generated by continuous variable time series models 312. First model predictions B 324 include one or more predicted values of one or more continuous variable messages 302 generated by continuous variable regression models 314. Second model predictions A 326 include one or more predicted values of one or more categorical variable messages 304 generated by categorical variable time series models 316. Second model predictions B 324 include one or more predicted values of one or more categorical variable messages 304 generated by categorical variable regression models 318.

In some embodiments, a residual error module 330 determines an error or residual between predicted values and actual values (e.g., difference between predicted and actual values, difference between predicted probability of classification and actual classification), and/or a vector thereof (e.g., vector of errors/residuals between predicted values across a time range and actual values across the time range). Residual error module 330 receives first model predictions A 322 and/or B 324, second model predictions A 326 and/or B 328, continuous variable messages 302, and/or categorical variable messages 304. Residual error module 330 generates residual error(s) A 332 based on first model predictions A 322 and continuous variable messages 302, residual error(s) B 334 based on first model predictions B 324 and continuous variable messages 302, residual error(s) C 336 based on second model predictions A 326 and categorical variable messages 304, and/or residual error(s) D 338 based on second model predictions B 328 and categorical variable messages 304. In various embodiments, residual error(s) A 332, residual error(s) B 334, residual error(s) C 336, and/or residual error(s) D 338 correspond to residual error(s) 266.

Meta models 340 receives one or more inputs, including first model prediction(s) A 322, first model predictions B 324, second model predictions A 326, second model predictions B 328, residual error(s) A 332, residual error(s) B 334, residual error(s) C 336, residual error(s) D 338, continuous variable messages 302, and/or categorical variable messages 304, and/or any combination thereof. Meta models 340 generates an output 342 based on the above-described inputs into meta models 340. In some embodiments, output 342 includes a score (e.g., a risk score, a probability score) reflecting the probability of an anomaly or attack. In some embodiments, output 342 includes a binary output (e.g., 0 or 1, yes or no, attack or no attack) that indicates a conclusion whether an anomaly/attack is present or not. In some embodiments, output 342 can include information associated with a possible anomaly or attack (e.g., a classification of the type of anomaly or attack, probabilit(ies) of different types of anomaly or attack). In some embodiments, output 342 includes outputs from multiple meta models 340 (e.g., a score from each meta model 340).

In some embodiments, machine learning system 300 can include an ensemble module (not shown) corresponding to ensemble module 250. The ensemble module can use one or more ensemble learning techniques (e.g., majority votes, averaging, individual thresholding and/or the like) on any of the above-described inputs into meta models 340 and/or output 342 to revise and/or refine output 342 and/or meta models 340.

In various embodiments, the specific timings of messages 302 and 304 are generally irrelevant to models 312-318 and meta models 340. That is, models 312-318, and meta models 340 as well, need not consider the timings of messages 302 or 304, other than the sequence order of messages as appropriate, in their analyses. Accordingly, machine learning system 300 can determine output 342 based on values of vehicle operational parameters without concern for the specific times when the values for the parameters occurred.

Figure 4:
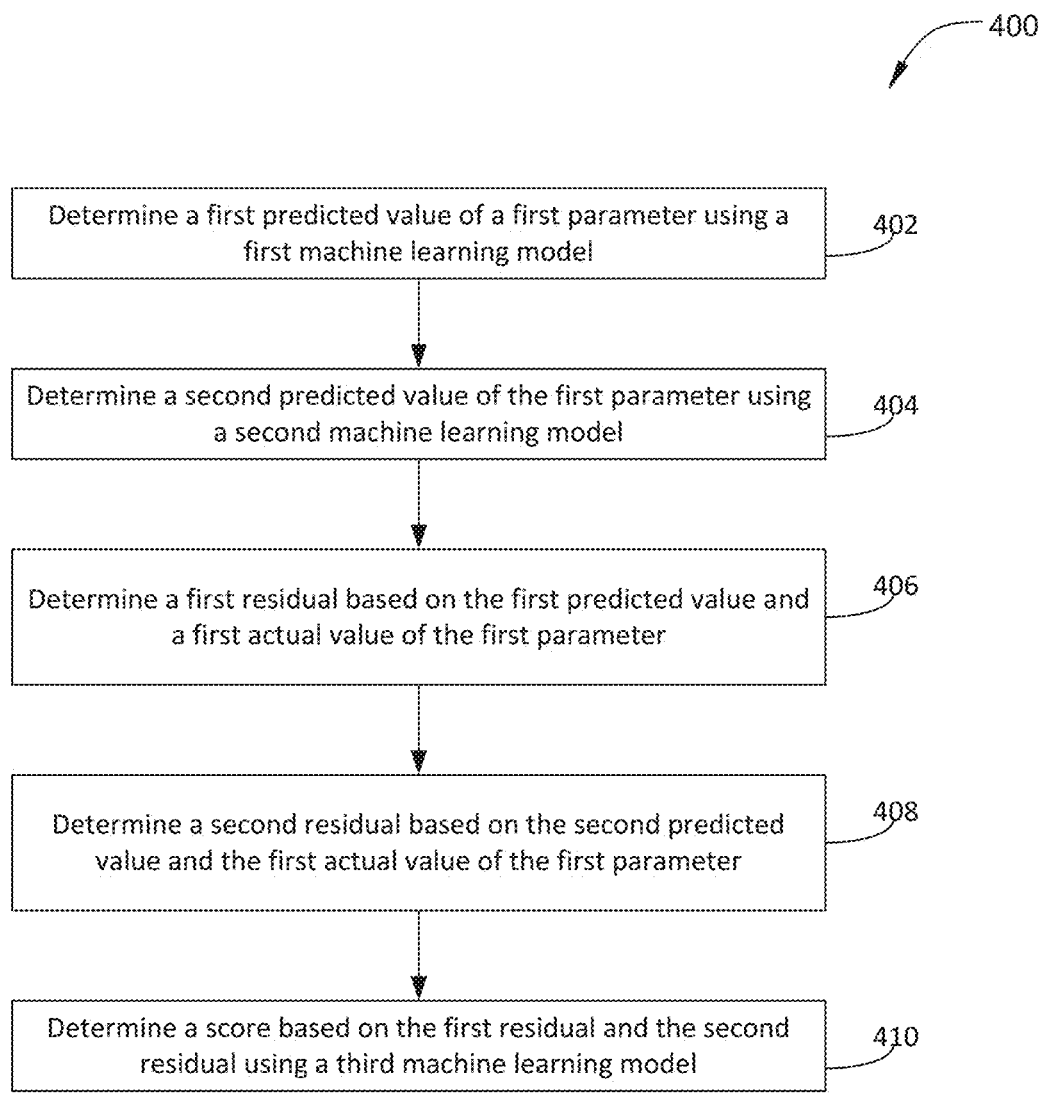
FIG. 4 is a flow diagram of method steps for detecting vehicle malfunctions or cyber attacks, according to various embodiments of the present disclosure.

FIG. 4 is a flow diagram of method steps for detecting vehicle malfunctions or cyber attacks, according to various embodiments of the present disclosure. Although the method steps are described with respect to the systems of FIGS. 1-3, persons skilled in the art will understand that any system configured to perform the method steps, in any order, falls within the scope of the various embodiments.

As shown, method 400 begins at step 402, where detection engine 124 determines a first predicted value of a first parameter using a first machine learning model. Detection engine 124 can receive one or more variable messages (e.g., a set of messages for current and/or historical data points) associated with a first vehicle operational parameter 282 and determine a predicted value for that parameter using a first machine learning model. For example, detection engine 124 could receive one or more continuous variable messages 302 associated with a first parameter and predict one or more values for that parameter using a continuous variable model amongst models 312 or 314, with the continuous variable messages 302 associated with the first parameter as inputs into the model. Alternatively, detection engine 124 could receive one or more categorical variable messages 304 associated with a first parameter and predict one or more probabilities for that parameter using a categorical variable model amongst models 316 or 318, with the categorical variable messages 304 associated with the first parameter as inputs into the model.

At step 404, detection engine 124 determines a second predicted value of the first parameter using a second machine learning model. Detection engine 124 can receive one or more variable messages (e.g., a set of messages for current and/or historical data points) associated with the first vehicle operational parameter 282 and determine another predicted value for that parameter using a second machine learning model. For example, detection engine 124 could receive one or more continuous variable messages 302 associated with the first parameter and predict one or more additional values for that parameter using a second continuous variable model amongst models 312 or 314, with the continuous variable messages 302 associated with the first parameter as inputs into the model. Additionally or alternatively, detection engine 124 could receive one or more categorical variable messages 304 associated with a second vehicle operational parameter 282 and predict one or more probabilities of classification for that parameter using a categorical variable model amongst models 316 or 318, with the categorical variable messages 304 associated with the second parameter as inputs into the model.

At step 406, detection engine 124 determines a first residual based on the first predicted value and a first actual value of the first parameter. Residual error module 230 can determine an error or residual or probability between the predicted value or probability determined in step 402 and an actual value or probability of the first vehicle operational parameter. For example, residual error module 330 could determine a residual error A 332 between a first model prediction A 322 and an actual value from a continuous variable message 302 associated with the same parameter as the first model prediction A 322. As another example, residual error module 330 could determine a residual error C 336 between a second model prediction A 326 and an actual value from a categorical variable message 304 associated with the same parameter as the second model prediction A 326.

At step 408, detection engine 124 determines a second residual based on the second predicted value and the first actual value of the first parameter. Residual error module 230 can determine an error or residual or probability between the predicted value or probability determined in step 404 and an actual value or probability of the second vehicle operational parameter. For example, residual error module 330 could determine a residual error B 334 between a first model prediction B 324 and an actual value from a continuous variable message 302 associated with the same parameter as the first model prediction B 324. As another example, residual error module 330 could determine a residual error 336 or 338 between a second model prediction 326 or 328 and an actual value from a categorical variable message 304 associated with the same parameter as the second model prediction 326 or 328.

At step 410, detection engine 124 determines a score based on the first residual and the second residual using a third machine learning model. Detection engine 124 can, using one or more meta models 240, determine a score reflecting a probability of anomaly or attack, with the first residual and the second residual, determined in steps 406 and 408 respectively, being inputs into the meta models for determining the score. For example, meta models 340 can receive residual errors 332, 334, 336, and/or 338 as inputs and determine an output 342 that indicates a probability of an anomaly or attack being present, a conclusion whether an anomaly or attack is present, a classification of a type of anomaly/attack, and/or a probability of a type of anomaly or attack. In some embodiments, the residual errors can be assembled into one or more vectors by residual error module 330 or meta models 340, and output 342 is determined based on the vectors.

In some embodiments, method 400 can be adapted for multiple parameters. Steps 402 and/or 404 can be adapted to predict values for one or more additional parameters using the same models and/or one or more additional models. Steps 406 and 408 can be adapted to determine residuals based on predicted values for the additional parameters and actual values of those parameters. Step 410 can be adapted to determine one or more additional outputs using one or more additional third machine learning models (e.g., additional meta models) and the residuals describe above.

In sum, an approach for detecting anomalies or cyber attacks on a vehicle includes an ensemble, multi-layer approach. In a first layer of models, one set of models predict values for vehicle operational parameters that are continuous variables, and another set of models predict classification probabilities for vehicle operational parameters that are categorical variables. Errors, residuals, and/or probability differences can be determined based on the predictions and actual values of the parameters. In a second layer of models, the errors, residuals, and/or probability differences can be used to determine a score that reflects a probability that an anomaly or attack is present, and/or other output indicating whether and what type of anomaly or attack is present.

At least one technical advantage of the disclosed techniques relative to the prior art is that the disclosed techniques provide an approach for detecting anomalies in and/or cyber attacks against a vehicle that does not rely on specific timing of events happening in the vehicle. Accordingly, the approach can be deployed in the vehicle or at a remote system without concern regarding corruption of the timings caused by transmission of data from the vehicle. Another technical advantage is that, by using an ensemble approach, the disclosed techniques can better handle different types of operational parameters and adapt to detecting anomalies and/or cyber attacks as they evolve with time without requiring additional training processes. These technical advantages provide one or more technological improvements over prior art approaches.

1. In some embodiments, a computer-implemented method for anomaly or attack detection comprises determining, using a first model, a first predicted value of a first variable message associated with a vehicle; determining, using a second model, a second predicted value of the first variable message associated with the vehicle; determining, based on a difference between an actual value of the first variable message and the first predicted value of the first variable message and on a difference between the actual value of the first variable message and the second predicted value of the first variable message, a vector; and determining, using a third model, an output value based on the vector, the output value corresponding to at least one of a likelihood that an anomaly or an attack is occurring or a type of the anomaly or the attack.

2. The method of clause 1, wherein the first variable message comprises a continuous variable message associated with a first operational parameter of the vehicle.

3. The method of clauses 1 or 2, wherein the first predicted value of the first variable message comprises a predicted value of the first operational parameter.

4. The method of any of clauses 1-3, wherein the first variable message comprises a categorical variable message associated with a first operational parameter of the vehicle.

5. The method of any of clauses 1-4, wherein the first predicted value of the first variable message comprises a predicted probability associated with the first operational parameter.

6. The method of any of clauses 1-5, wherein the first model comprises a time series model.

7. The method of any of clauses 1-6, wherein the second model comprises a regression model.

8. The method of any of clauses 1-7, wherein the vector comprises a vector of errors or residuals.

9. The method of any of clauses 1-8, wherein the vector comprises a vector of probabilities.

10. The method of any of clauses 1-9, further comprising determining, using a fourth model, a third predicted value of a second variable message associated with the vehicle.

11. The method of any of clauses 1-10, further comprising determining, using a fourth model, a second output value based on the vector; and combining the output value and the second output value, the combined output value corresponding to at least one of the likelihood that the anomaly or the attack is occurring or the type of the anomaly or the attack.

12. The method of any of clauses 1-11, wherein the third model comprises a meta model.

13. The method of any of clauses 1-12, further comprising determining, using the first model, a third predicted value of a second variable message associated with the vehicle.

14. The method of any of clauses 1-13, wherein determining, using the first model, the first predicted value of the first variable message associated with the vehicle comprises determining the first predicted value using at least one second variable messages associated with the vehicle, wherein the at least one second variable message is correlated with the first variable message.

15. In some embodiments, one or more non-transitory computer-readable storage media include instructions that, when executed by one or more processors, cause the one or more processors to perform the steps of determining, using a first model, a first predicted value of a first variable message associated with a vehicle; determining, using a second model, a second predicted value of the first variable message associated with the vehicle; determining, based on a difference between an actual value of the first variable message and the first predicted value of the first variable message and on a difference between the actual value of the first variable message and the second predicted value of the first variable message, a vector; and determining, using a third model, an output value based on the vector, the output value corresponding to at least one of a likelihood that an anomaly or an attack is occurring or a type of the anomaly or the attack.

16. The one or more non-transitory computer-readable storage media of clause 15, wherein the first model comprises a time series model, and the second model comprises a regression model.

17. The one or more non-transitory computer-readable storage media of clauses 15 or 16, wherein the first model comprises a first time series model, and the second model comprises a second time series model.

18. The one or more non-transitory computer-readable storage media of any of clauses 15-17, wherein the first model comprises a first regression model, and the second model comprises a second regression model.

19. In some embodiments, a system comprises a memory storing an application; and one or more processors that, when executing the application, is configured to determine, using a first model, a first predicted value of a first variable message associated with a vehicle; determine, using a second model, a second predicted value of a second variable message associated with the vehicle; determine, based on a difference between an actual value of the first variable message and the first predicted value of the first variable message and on a difference between an actual value of the second variable message and the second predicted value of the second variable message, a vector; and determine, using a third model, an output value based on the vector, the output value corresponding to at least one of a likelihood that an anomaly or an attack is occurring or a type of the anomaly or the attack.

20. The system of clause 19, wherein the one or more processors, when executing the application, is further configured to determine, using the first model, a third predicted value of a third variable message associated with the vehicle.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for anomaly or attack detection, the method comprising:
   determining, using a first model, a first predicted value of a first variable message associated with a vehicle;
   determining, using a second model different from the first model, a second predicted value of the first variable message associated with the vehicle, wherein the first model and the second model are selected based on resilience to one or more types of cyber attacks;
   determining, based on a difference between an actual value of the first variable message and the first predicted value of the first variable message and on a difference between the actual value of the first variable message and the second predicted value of the first variable message, a vector; and
   determining, using a third model, an output value based on the vector, the output value corresponding to at least one of a likelihood that an anomaly or an attack is occurring or a type of the anomaly or the attack.

2. The method of claim 1, wherein the first variable message comprises a continuous variable message associated with a first operational parameter of the vehicle.

3. The method of claim 2, wherein the first predicted value of the first variable message comprises a predicted value of the first operational parameter.

4. The method of claim 1, wherein the first variable message comprises a categorical variable message associated with a first operational parameter of the vehicle.

5. The method of claim 4, wherein the first predicted value of the first variable message comprises a predicted probability associated with the first operational parameter.

6. The method of claim 1, wherein the first model comprises a time series model.

7. The method of claim 1, wherein the second model comprises a regression model.

8. The method of claim 1, wherein the vector comprises a vector of errors or residuals.

9. The method of claim 1, wherein the vector comprises a vector of probabilities.

10. The method of claim 1, further comprising determining, using a fourth model, a third predicted value of a second variable message associated with the vehicle.

11. The method of claim 1, further comprising:
    determining, using a fourth model, a second output value based on the vector; and
    combining the output value and the second output value, the combined output value corresponding to at least one of the likelihood that the anomaly or the attack is occurring or the type of the anomaly or the attack.

12. The method of claim 1, wherein the third model comprises a meta model.

13. The method of claim 1, further comprising determining, using the first model, a third predicted value of a second variable message associated with the vehicle.

14. The method of claim 1, wherein determining, using the first model, the first predicted value of the first variable message associated with the vehicle comprises determining the first predicted value using at least one second variable messages associated with the vehicle, wherein the at least one second variable message is correlated with the first variable message.

15. One or more non-transitory computer-readable storage media including instructions that, when executed by one or more processors, cause the one or more processors to perform the steps of:
    determining, using a first model, a first predicted value of a first variable message associated with a vehicle;
    determining, using a second model different from the first model, a second predicted value of the first variable message associated with the vehicle, wherein the first model and the second model are selected based on resilience to one or more types of cyber attacks;
    determining, based on a difference between an actual value of the first variable message and the first predicted value of the first variable message and on a difference between the actual value of the first variable message and the second predicted value of the first variable message, a vector; and determining, using a third model, an output value based on the vector, the output value corresponding to at least one of a likelihood that an anomaly or an attack is occurring or a type of the anomaly or the attack.

16. The one or more non-transitory computer-readable storage media of claim 15, wherein the first model comprises a time series model, and the second model comprises a regression model.

17. The one or more non-transitory computer-readable storage media of claim 15, wherein the first model comprises a first time series model, and the second model comprises a second time series model.

18. The one or more non-transitory computer-readable storage media of claim 15, wherein the first model comprises a first regression model, and the second model comprises a second regression model.

19. A system, comprising:
a memory storing an application; and
one or more processors that, when executing the application, is configured to:

determine, using a first model, a first predicted value of a first variable message associated with a vehicle;

determine, using a second model different from the first model, a second predicted value of a second variable message associated with the vehicle, wherein the first model and the second model are selected based on resilience to one or more types of cyber attacks;

determine, based on a difference between an actual value of the first variable message and the first predicted value of the first variable message and on a difference between an actual value of the second variable message and the second predicted value of the second variable message, a vector; and determine, using a third model, an output value based on the vector, the output value corresponding to at least one of a likelihood that an anomaly or an attack is occurring or a type of the anomaly or the attack.

20. The system of claim 19, wherein the one or more processors, when executing the application, is further configured to determine, using the first model, a third predicted value of a third variable message associated with the vehicle.

* * * * *